United States Patent
Dietrich

Patent Number: 5,912,641
Date of Patent: Jun. 15, 1999

[54] INDOOR SATELLITE CELLULAR REPEATER SYSTEM

[75] Inventor: Frederick J Dietrich, Palo Alto, Calif.

[73] Assignee: Globalstar L.P., San Jose, Calif.

[21] Appl. No.: 08/786,705

[22] Filed: Jan. 21, 1997

[51] Int. Cl.$^6$ .................................................. H04B 7/185
[52] U.S. Cl. ............................................ 342/354; 342/353
[58] Field of Search .................................... 342/353, 354; 343/893; 379/59, 60; 375/1

[56] References Cited

U.S. PATENT DOCUMENTS

| | | | |
|---|---|---|---|
| 5,233,626 | 8/1993 | Ames ............................................. | 375/1 |
| 5,422,647 | 6/1995 | Hirshfield et al. ....................... | 342/354 |
| 5,448,623 | 9/1995 | Wiedeman et al. ........................ | 379/59 |
| 5,504,493 | 4/1996 | Hirshfield ................................. | 342/372 |
| 5,526,404 | 6/1996 | Wiedeman et al. ........................ | 379/60 |
| 5,552,798 | 9/1996 | Dietrich et al. ........................... | 343/893 |

OTHER PUBLICATIONS

Product description: "Communications Extender (A.C.E.)", Microwave Product Digest, Jun. 1995, p. 38.

"Radiating Cable Enhances In–Building And Tunnel Coverage", Dennis J. Burt, Wireless Systems Design, Sep. 1996, (no month).

*Primary Examiner*—William Oen
*Attorney, Agent, or Firm*—Perman & Green, LLP

[57] ABSTRACT

A satellite repeater system (10) provides a connection from satellites (12) to user terminals (14) that are located within a building. The satellite cellular repeater system receives satellite signals on a satellite receive antenna (18) and retransmits the received signal within a building using amplifiers (30) and indoor antennas (32). The system also receives signals from a user terminal, amplifies the signals, and retransmits the user terminal signals with an outdoor satellite antenna (20) back to a satellite. For a multi-story building each floor may be provided with a local transmit antenna (32), transmit amplifier (30), receive antenna (34), and receive amplifier (36) for conducting bidirectional communications with satellite telephones or user terminals that are present on that floor. The satellite signal repeater system employs an outdoor satellite receive antenna structure that tracks non-geosynchronous orbiting satellites as they move with respect to the outdoor satellite receive antenna, and thus provides system selectivity so as to minimize interference from and into other communications systems that may operate in the same frequency band(s).

22 Claims, 2 Drawing Sheets

INDOOR SATELLITE CELLULAR REPEATER SYSTEM

FIELD OF THE INVENTION

This invention relates generally to satellite communications systems and, in particular, to satellite communications systems that are operable with hand-held user terminals for providing communication links to existing telephone and/or network infrastructures.

BACKGROUND OF THE INVENTION

Satellite telephone systems are emerging as a new and important global business. These systems utilize many individual circuits routed through one satellite or a constellation of many satellites to provide communications for terrestrial terminals. One significant advantage of the satellite telephone system is that it provides ubiquitous coverage of large areas of the earth without requiring the construction of many small terrestrial cells.

A problem that can arise in such systems is due to the typically line-of-sight nature of the RF communication links between user terminals and the satellite or satellites providing service to the user terminal. This problem is especially made manifest when the user terminal is carried inside of a building or other structure that effectively blocks the line-of-sight to the satellite.

Studies have shown that RF signals deteriorate inside of buildings at at least twice the rate that they do in free space. That is, instead of −20 dB for a 10 times increase in distance, the signals decrease in amplitude by as much as −40 dB for the same increase in distance. This implies that the signal arriving from a communication satellite is very quickly attenuated to a useless level inside of a building, especially if the free-space link margins may be only about 10 dB to begin with.

It is known in the terrestrial cellular industry to provide repeaters with outdoor terrestrial cellular antennas and amplifiers, and to position antennas indoors. These systems do not, however, discriminate between cellular systems. Furthermore, the tracking of the cell site is not necessary since it is fixed in position, unlike a non-geosynchronous orbit (non-GSO) satellite, such as a low earth orbit (LEO) or a medium earth orbit (MEO) satellite that continuously changes its position with respect to a point on the ground.

OBJECTS OF THE INVENTION

It is a first object of this invention to provide an indoor signal repeater system for use with a satellite communication system.

It is a second object of this invention to provide an indoor signal repeater system for use with a non-GSO satellite communication system, and that is capable of tracking satellites of a desired satellite constellation as the satellites pass overhead.

SUMMARY OF THE INVENTION

The foregoing and other problems are overcome and the objects of the invention are realized by methods and apparatus in accordance with embodiments of this invention, wherein a satellite repeater system is used to provide a connection from satellites to satellite telephones or user terminals (hand-held or desk-top) that are located within a building. The satellite cellular repeater system receives satellite signals on a satellite receive antenna and retransmits the received signal within a building using amplifiers and indoor antennas. The system also receives signals from a user terminal, amplifies the signals, and retransmits the user terminal signals with an outdoor satellite antenna back to a satellite. For a multi-story building each floor may be provided with a local transmit antenna, transmit amplifier, receive antenna, and receive amplifier for conducting bidirectional communications with satellite telephones or user terminals that are present on that floor.

The satellite signal repeater system employs an outdoor satellite antenna structure that tracks non-geosynchronous orbiting satellites as they move with respect to the outdoor satellite antenna, and thus provides system selectivity so as to minimize interference from and into other communications systems that may operate in the same frequency band(s).

The teaching of this invention is applicable to both low earth orbit (LEO) and medium earth orbit (MEO) satellite systems, as well as to PCS satellite systems and geosynchronous orbit (GSO) satellite systems.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
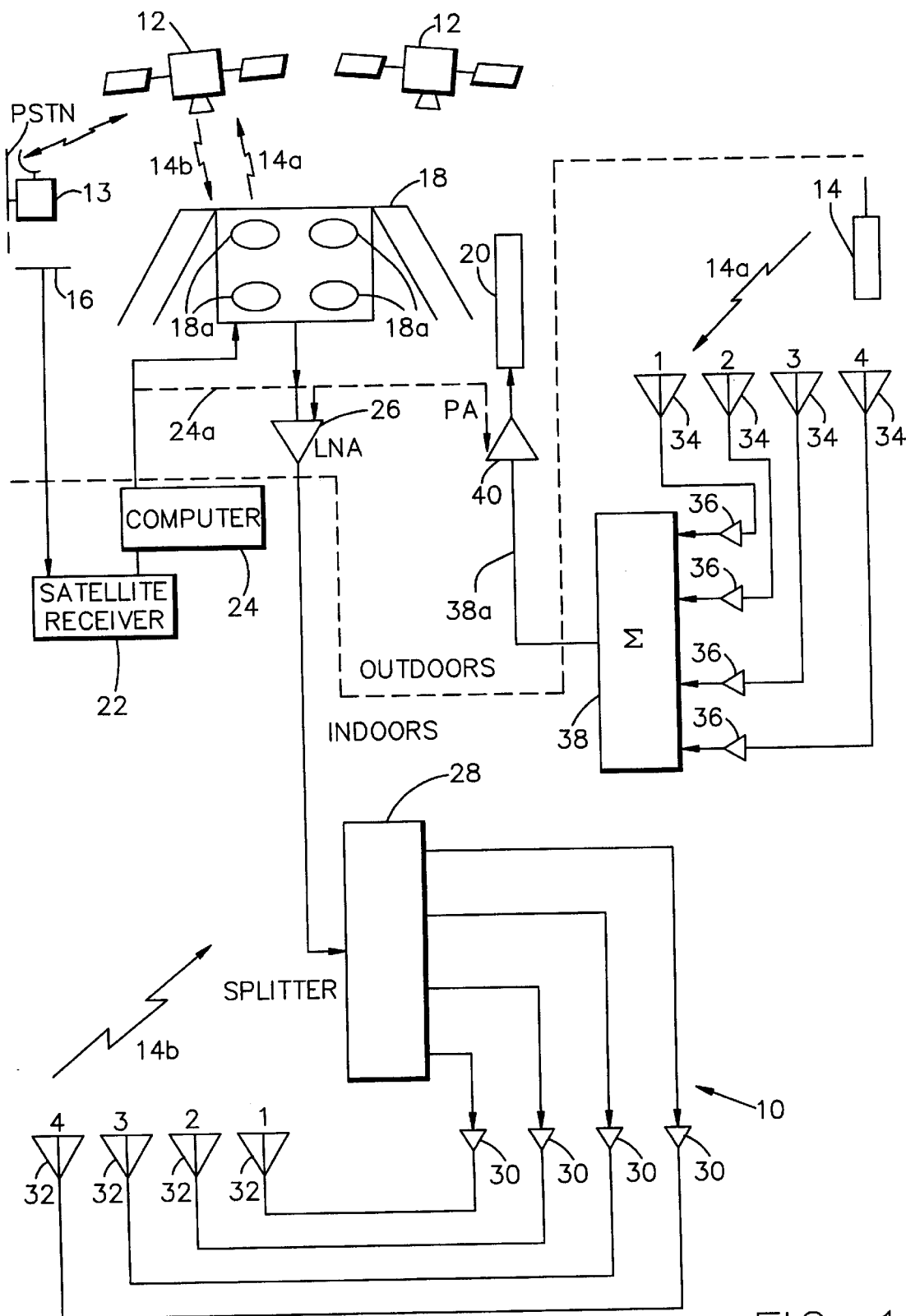
FIG. 1 is an simplified block diagram of an embodiment of a satellite repeater system in accordance with this invention.

The following U.S. patents teach various aspects of a LEO satellite constellation, and the associated communication system, which may be used in conjunction with the satellite repeater system 10 shown in FIG. 1: U.S. Pat. No. 5,422,647, issued Jun. 6, 1995, entitled "Mobile Communication Satellite Payload", by E. Hirshfield and C. A. Tsao; U.S. Pat. No. 5,504,493, issued Apr. 2, 1996, entitled "Active Transmit Phased Array Antenna with Amplitude Taper", by E. Hirshfield; U.S. Pat. Nos. 5,448,623, issued Sep. 5, 1995, and 5,526,404, issued Jun. 11, 1996, "Satellite Telecommunications System Using Network Coordinating Gateways Operative with a Terrestrial Communication System", by R. A. Wiedeman and P. A. Monte; and U.S. Pat. No. 5,233,626, issued Aug. 3, 1993, entitled "Repeater Diversity Spread Spectrum Communication System", by S. A. Ames. Of particular interest herein is the antenna described in U.S. Pat. No. 5,552,798, issued Sep. 3, 1996, entitled "Antenna for Multipath Satellite Communication Links", by F. J. Dietrich and P. A. Monte. The disclosures of these various U.S. Patents are incorporated by reference herein in their entireties.

The satellite repeater system 10 shown in FIG. 1 can be considered as a bi-directional repeater. The system 10 receives signals from one or more satellites 12 on an omnidirectional antenna 16 and a directional antenna 18 having receive elements 18a, amplifies the received signals, and re-radiates the signals inside of a building in a frequency band suitable for reception by a user terminal (UT) 14. The system 10 also receives signals transmitted by the UT 14, amplifies the received signals, and transmits the signals with a transmit satellite antenna 20 to the at least one satellite 12.

The satellite signal that is transmitted to the receive antenna 18 is first uplinked from a ground station 13, such as a gateway that is bidirectionally coupled to a terrestrial communications network, such as the public switched telephone network (PSTN). Private networks can also be interface in this manner. The signal that is transmitted from the antenna 20 to the satellite 12 is downlinked to the ground station 13. In this manner a duplex telephone or data connection can be established between the UT 14 and a telephone, modem, or facsimile device that is connected to the PSTN (or private network).

The system 10 further includes a satellite receiver 22 connected to an output of the omnidirectional receive antenna 16. A system controller such as a computer 24 is connected to the satellite receiver 22 and with control lines 24a to the directional antenna 18 for controlling the selection and switching of the receive elements 18a, as will be described below. A low noise amplifier (LNA) 26 is coupled to the receive elements 18a of antenna 18 and provides an amplified receive signal to a splitter 28. The splitter 28 has a plurality of outputs for distributing the received signal to various locations, such as rooms or floors, within the building. Because of the possibly considerable distances that may be involved, it is preferred to provide a plurality of floor transmit amplifiers 30, individual ones of which have an associated antenna 32. By example, each floor of a multi-story building would be provided with at least one floor amplifier 30 and corresponding floor antenna 32. The antennas 32 transmit the received satellite signals to any UTs 14 within range. Also provided on each floor is at least one of a set of UT receive antennas 34 each having an output connected to a floor receive amplifier 36. The outputs of the floor receive amplifiers are brought to a central node where a combiner 38 combines the signals into a composite signal 38a that is applied to a transmitter power amplifier (PA) 40, and thence to the satellite transmit antenna 20. The LNA 26 and power amplifier 40 are also connected to the computer 24 through the control lines 24a whereby the operation of these amplifiers can be varied as required. By example, the amplifiers 26 and 34 may be variable gain amplifiers that are controlled from the computer 24.

It can be appreciated that the UT 14 can be a hand-held satellite phone that a user has carried into the building. The UT 14 may also be a wireless desk-top phone that is adapted for use with the satellites 12. In a presently preferred, but not limiting, embodiment of this invention the UTs 14 are capable of operating in a full duplex mode and communicate via, by example, L-band RF links (uplink or reverse link 14a) and S-band RF links (downlink or forward link 14b). The reverse L band RF link 14a may operate within a frequency range of 1.61 GHZ to 1.625 GHZ, a bandwidth of 16.5 MHz, and is modulated with packetized digital voice signals and/or data signals in accordance with a spread spectrum technique. The forward S band RF link 14b may operate within a frequency range of 2.485 GHz to 2.5 GHZ, at a bandwidth of 16.5 MHz. Other frequency bands, such as the new 1.9/2.1 GHz PCS band, and others, may also be employed.

It can be further appreciated that the UT 14 need not be modified for indoor operation. That is, it transmits and receives in the same frequency bands as it would if carried outside, where it would normally communicate directly with one or more of the satellites 12. In other words, the user terminal 14 is operative without modification both within the structure and outside of the structure for communicating with a terrestrial communications network, such as the PSTN, via at least one satellite 12 of the constellation of satellites and the ground station or gateway 13.

The receive antenna 18 is operated to select a single satellite to receive, and places a high-gain beam on that satellite, thereby "capturing" a most favored satellite for communication with one or more UTs 14 inside the building. The transmit antenna 20 may also have a similar steerable beam, or it can radiate an azimuthally-omnidirectional signal, depending on considerations such as interference. A low transmit antenna gain can be compensated for through the use of a higher power amplifier 22, since the power amplifier 22 can be connected to the power mains in the building. This is not generally possible with the hand-held, portable UT 14, where battery size and life are critical factors for users.

The ability to select a particular satellite 12, and switch or hand-off between satellites as they change elevation angles with respect to the antenna 18, is an important aspect of this invention. The directive nature of the receive antenna 18, and possibly also the transmit antenna 20, enables the system 10 to preferentially select the satellites of one satellite system over others that may be operating in the same frequency band, thereby reducing interference to and from other systems.

The antenna beam steering is preferably accomplished by means of the satellite receiver 22 and the computer 24. The satellite receiver 22 receives and stores time-tagged ephemerides data for all satellites of the desired satellite constellation. Based on this ephemerides data the computer 24 is able to calculate, using well known algorithms, what satellites are visible, and at what elevation angles, at all points in time. The computer 24 then gives control signals via the control bus 24a to the antenna 18 to steer it to a most desirable satellite, while keeping track of the next satellite(s) which will be rising over the horizon. At the appropriate time, the computer 24 switches the antenna beam from one satellite to another. This switching is done in short period of time, and does not disrupt an on-going communication. The switch over may be referred to as a "hard handoff". If desired, a new communication link may be established with the new satellite before terminating the communication link with the current satellite. The switch-over in this case may be referred to as a "soft handoff". This implementation may require turning on two beams simultaneously in order to receive signals from two widely-separated satellites.

Figures 2A, 2B:
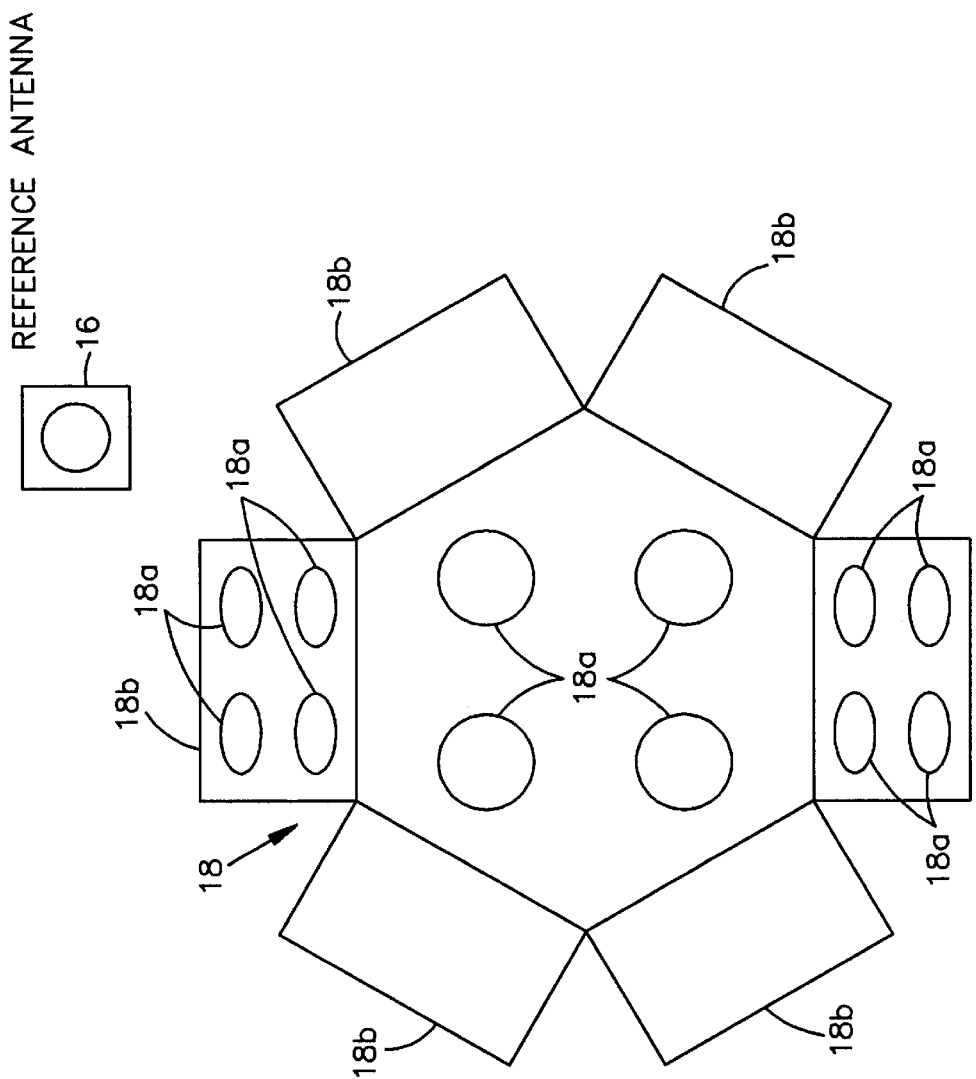
FIGS. 2A and 2B illustrate a presently preferred embodiment of a satellite antenna for use with the system shown in FIG. 1.

The receive antenna 18 illustrated in FIGS. 2A and 2B is constructed as a switched, flat-plate array. Each flat plate 18a produces a beam in a given direction in elevation and azimuth. The various beams overlap in order to produce a minimum level of gain in all directions. Each beam rejects signals that are outside its coverage area. The size and number of beams required is determined by how much gain is required in a given direction, and how much rejection is desired in undesired directions. Switching between beams can be accomplished in a short period of time (e.g., a microsecond), resulting on no disruption of the telephone conversations that are ongoing.

The flat plates 18a of printed-circuit antennas can be replaced by fixed arrays of helices or other circularly-polarized elements, or by a sheet-metal horn antenna with similar radiating properties.

With regard to the antenna 18, reference may be had to the above-noted U.S. Pat. No. 5,552,798, issued Sep. 3, 1996, entitled "Antenna for Multipath Satellite Communication Links", by F. J. Dietrich and P. A. Monte.

It is noted that it is difficult to build a phased array that covers, with reasonable gain, nearly 180° in elevation angle (0°-90°-0°) on a single, flat surface. Preferably the array is constructed with a plurality of flat, canted phased arrays 18b. Individual ones of the plurality of phased arrays point to different sectors of the sky, where each beam steers over its coverage sector, and then the antenna switches to the next beam, which would cover its sector. The antenna 18 thus constructed provides superior gain and rejection of undesired signals over an antenna having fixed beams.

Of course, if the satellite system employs a geostationary satellite, both the transmit and receive antennas may use directional beams which are fixed-pointed to the geostationary satellite. This technique very specifically particularizes the system 10 to the geostationary satellite.

It should be noted that if two adjacent beams are simultaneously turned on, there will be an interference pattern formed between the two beams that can cause undesirable peaks and nulls. However, for the antenna described in U.S. Pat. No. 5,552,798, with faces separated by 60 degrees in azimuth and elevation, the minimum gain at a null is only a few tenths of dB below that of a beam peak, and the peak gain of the interference pattern is several dB higher than that of a single beam. As such, and potential problem from interference patterns is minimized.

A simplest implementation within a structure or building is comprised of a single unit that contains both the transmit amplifier 40 and the receive amplifier 26, and mounted broad-band antennas 32 and 34 that operate in both frequency bands (i.e., the forward and reverse frequency bands, if they are different). The unit preferably has "visibility" from all portions of the floor or areas that it services in order to provide adequate signals to and from the UTs 14. Depending on the construction and layout of the floors of the building (e.g., placements and numbers of walls and partitions), this arrangement may be difficult to realize.

It is, however, within the scope of this invention to employ a so-called "leaky coaxial cable" for the indoor transmit antennas 32. Such antennas are known for use in, for example, tunnels, to radiate signals uniformly throughout the length of the tunnel. This antenna type includes a coaxial cable with a very poor "shield", so that fields radiate from it in a controlled manner. Slots may be periodically cut in the shield to form radiating slot dipoles. Such a cable can be run in the ceiling at the center of a floor in a building, or around the perimeter of the ceiling to give maximum coverage. If interior wall dividers are non-conducting, the cable antenna can cover the entire floor. If the walls are conducting, the cable may be run into enclosed rooms and offices in order to provide adequate coverage.

The indoor transmit antennas 32 and amplifiers 30 are preferably designed and sized so that the signal radiated indoors is typically not more than about 10 dB above what the UT 14 normally receives directly from the satellite 12. In this case the radiation coming from out-of-doors, assuming typical losses within the building, is substantially lower than what would be received directly from the satellite. This limits interference to the outdoor UTs 14, and allows them to operate as if there was not a system operating inside the building.

For the receive path, an equivalent situation exists. The receive amplifiers 36 and antennas 34 are sized and arranged so that signals from UTs 14 outside the building do not penetrate the building and enter the repeater system. If this were to occur, the capacity of the system 10 would be reduced for serving those UTs 14 within the building. The placement of the antennas 34 is thus a consideration, and they are preferably located away from outside walls. Setting the noise figure of the interior receive amplifiers 34 to a relatively high value also aids in suppressing the reception of outside radiation. A leaky coaxial cable can also be used for the indoor receive function.

The use of this invention is also advantageous for those satellite systems that transmit and receive in the same frequency band, and that use time division duplex (TDD). In this case, the receive amplifiers 26 and 34 and the transmit amplifiers 34 and 40 all operate at the same frequency, and it is necessary that only one chain of amplification be operating at a time, or the antenna coupling would cause the system to oscillate. The control lines 24a connected to the LNA 26 and the power amplifier 40 can be used to selectively disable one or the other, depending on the direction of signal flow. In this case the satellite receiver 22 can be employed to receive signal flow control pulses from the communication signals and to provide the signal timing to the computer 24 for control of the amplifiers 26 and 40.

The signal propagation within an enclosed space, such as a building, results in multipath propagation and multiple signals arriving at and from the UT 14. One conventional technique for dealing with multipath detects the received signal from more than one antenna, and switches the circuit to the antenna with the strongest signal, thereafter using that antenna for both transmit and receive. However, this technique would be suitable for only a single user terminal, as multiple user terminals will have different interference patterns with respect to the antenna.

CDMA systems do not require such tracking and switching, as they use the multipath reflection signals as additional signals, and add them to the primary signal, if such a signal can be identified, using a well known Rake receiver. In the presently preferred CDMA embodiment of this invention both the UT 14 and the gateway 13 employ Rake receivers, as they do in the present system. As such, the effects of multipath are minimized through the use of coherent combining techniques. Reference in this regard can be had to the above-mentioned U.S. Pat. No. 5,233,626, issued Aug. 3, 1993, entitled "Repeater Diversity Spread Spectrum Communication System", by S. A. Ames, which describes a Rake receiver used for coherently combining spread spectrum signals.

For a system based on time division/multiple access TDMA signals, the effects of multipath can be reduced through, by example, the use of known types of adaptive equalization.

It is also within the scope of this invention to use satellite and user terminal transmitted signals that are continuous frequency modulated signals.

The operation of the satellite repeater system 10 is completely transparent to the satellite-telephone system, so long as adequate attention is paid to the radiation of the indoor transmitters 32 to the out-of-doors, where they could cause interference to other UTs, as well as the reception by the indoor receivers 36 of out-of-doors UT transmissions. The beam of the satellite receive antenna 18 is always directed under the control of the computer 24. The computer 24 has knowledge of the ephemerides of all the satellites 12 of the desired system, as well as the time and date, and is thus enabled to direct the beam to the most favorable satellite that is currently visible. The downlink signals 14b are thereby received by the antenna 18, amplified, and re-radiated by antennas 32 inside the building, where they appear to the UT 14 as the satellite signal. For the return signal, the UT 14 radiates a signal that is detected by the indoor antenna 34, is amplified, and then radiated from the outdoor satellite antenna 20 to the most favored satellite 12.

It is noted that the antenna 20 may be an omnidirectional or a directional antenna. In a further embodiment of this invention the antenna 20 can be constructed in a similar manner to the antenna 18, that is with various transmit elements oriented at some angle and direction with respect to a normal to the surface of the earth. In all cases it is assumed that the antennas 18 and 20 are located so as to be free, if possible, from signal path obstructions due to surrounding buildings, foliage and the like.

The in-building repeater system that is a feature of this invention not only overcomes the loss of signal that is experienced when the satellite signal propagates into the building, but actually improves the signal strength by providing arbitrary amounts of amplifier gain between the satellite signal and the UT signal. With well-placed repeater satellite antennas 32, the signal-to-noise ratio experienced by the UT 14 inside the building may exceed that experienced when operated out-of-doors with a direct line of sight to the satellite 12, because of the UT's lower antenna gain.

The advantages of this invention are best realized in large, multi-story buildings of steel and concrete construction. In this case there are one or more amplifiers and antennas for each floor, all connected in parallel so as to carry all the communication signals going in both directions. Single-story dwellings made of wood with a non-conducting roof may, for example, not require any repeater.

The satellite repeater system 10 has been described to provide localized or "cellular" coverage inside buildings for satellite-based communications systems. The system 10 uses antenna directivity to distinguish between satellite-based systems, and to particularize itself to only a desired system, excluding other systems that may be operating in the same frequency band and with the same modulation scheme. The teaching of this invention can be employed with any system that is currently licensed in the U.S.A., and any systems that are being anticipated. The teaching of this invention solves the longstanding problem related to operation deep inside buildings that provide shielding from satellite signals. In other words, it extends the operating range of the user's telephone, or UT 14, to within buildings that would otherwise render the user's terminal inoperative or only marginally operative.

With regard to user terminal power control, it is noted that the user terminal 14 and gateway 13 can operate in a normal manner, as when the user terminal 14 is located outside of the building. If a signal received by the gateway 13 is weak, it requests the user terminal 14 to transmit with more power. This is accomplished by periodically transmitting power control bits to the user terminal over the forward link. However, the signal from the user terminal 14 will normally be strong, as it has an arbitrarily strong power amplifier feeding the transmit antenna as part of the indoor repeater.

While the invention has been particularly shown and described with respect to preferred embodiments thereof, it will be understood by those skilled in the art that changes in form and details may be made therein without departing from the scope and spirit of the invention.

What is claimed is:

1. A satellite communications system of a type that employs at least one satellite for relaying user communications from a ground station to a user terminal, said system comprising:

an in-building satellite repeater system comprised of,
a multi-beam satellite signal receive antenna having an output coupled to a first receive amplifier, said first receive amplifier having an output coupled to an input of at least one first transmit amplifier and in-building transmit antenna for transmitting a received satellite signal within the building for reception by a user terminal;
a satellite user signal transmit antenna having an input coupled to an output of a second transmit amplifier, said transmit amplifier having an input coupled to an output of at least one second receive amplifier and in-building receive antenna that receives a user terminal transmitted signal within the building; and
a controller having an output coupled to said satellite user signal receive antenna for controllably selecting one or more beams so as to track a desired satellite that moves with respect to said satellite user signal receive antenna.

2. An in-building satellite repeater system as set forth in claim 1, wherein there are a plurality of said second receiver amplifiers and in-building receive antennas, said plurality of second receiver amplifiers having outputs coupled to inputs of a signal combiner, said signal combiner having an output coupled to said input of said second transmit amplifier.

3. An in-building satellite repeater system as set forth in claim 1, wherein there are a plurality of said first transmit amplifiers and in-building transmit antennas, said plurality of first transmit amplifiers having inputs coupled to outputs of a signal splitter, said signal splitter having an input coupled to said output of said first receive amplifier.

4. An in-building satellite repeater system as set forth in claim 1, wherein said satellite signal and said user terminal transmitted signal are spread spectrum signals.

5. An in-building satellite repeater system as set forth in claim 1, wherein said satellite signal and said user terminal transmitted signal are code division, multiple access signals.

6. An in-building satellite repeater system as set forth in claim 1, wherein said satellite signal and said user terminal transmitted signal are time division, multiple access signals.

7. An in-building satellite repeater system as set forth in claim 1, wherein said satellite signal and said user terminal transmitted signal are time division duplex signals, and wherein said controller is further coupled at least to said first receive amplifier and to said second transmit amplifier for selectively operating only one at a time, in accordance with a direction of signal flow between said satellite and said multi-beam satellite signal receive antenna.

8. An in-building satellite repeater system as set forth in claim 7, and further comprising a satellite receiver and antenna for receiving timing control signals from said satellite, said satellite receiver having an output coupled to said controller for outputting said timing signals to said controller for use by said controller in controlling the operation of said first receive amplifier and said second transmit amplifier.

9. An in-building satellite repeater system as set forth in claim 1, wherein said satellite signal and said user terminal transmitted signal are continuous frequency modulated signals.

10. An in-building satellite repeater system as set forth in claim 1, and further comprising a satellite receiver and antenna for receiving satellite ephemerides data from said satellite, said satellite receiver having an output coupled to said controller for outputting said satellite ephemerides data to said controller for use by said controller in controlling the selection of said one or more beams.

11. A satellite communications system of a type that uses at least one satellite for relaying user communications from a ground station to a user terminal, said system comprising:

a satellite repeater system located within a structure, comprised of, a multi-beam satellite signal receive antenna having an output coupled to a first receive amplifier, said first receive amplifier having an output coupled to inputs of a plurality of first transmit amplifiers and in-structure transmit antennas for transmitting a received satellite signal at a plurality of different locations within the structure for reception by user terminals in said different locations;

a satellite user signal transmit antenna having an input coupled to an output of a second transmit amplifier, said transmit amplifier having an input coupled to outputs of a plurality of second receive amplifiers and in-structure receive antennas that receive user terminal transmitted signals at different locations within the structure; and a controller having an output coupled to said satellite user signal receive antenna for controllably selecting one or more beams so as to track a first satellite of a desired satellite constellation that moves with respect to said satellite user signal receive antenna, and to handoff on-going communications from said first satellite to a second satellite of said desired satellite constellation.

12. A satellite repeater system as set forth in claim 11, wherein said satellite signal and said user terminal transmitted signals are spread spectrum signals.

13. A satellite repeater system as set forth in claim 11, wherein said satellite signal and said user terminal transmitted signals are code division, multiple access signals.

14. A satellite repeater system as set forth in claim 11, wherein said satellite signal and said user terminal transmitted signals are time division, multiple access signals.

15. A satellite repeater system as set forth in claim 11, wherein said satellite signal and said user terminal transmitted signals are time division duplex signals, and wherein said controller is further coupled at least to said first receive amplifier and to said second transmit amplifier for selectively operating only one at a time, in accordance with a direction of signal flow between a currently selected satellite and said multi-beam satellite signal receive antenna.

16. A satellite repeater system as set forth in claim 15, and further comprising a satellite receiver and antenna for receiving timing control signals from said satellite, said satellite receiver having an output coupled to said controller for outputting said timing signals to said controller for use by said controller in controlling the operation of said first receive amplifier and said second transmit amplifier.

17. A satellite repeater system as set forth in claim 11, wherein said satellite signal and said user terminal transmitted signals are continuous frequency-modulated signals.

18. A satellite repeater system as set forth in claim 11, and further comprising a satellite receiver and antenna for receiving satellite ephemerides data from said satellite, said satellite receiver having an output coupled to said controller for outputting said satellite ephemerides data to said controller for use by said controller in controlling the selection of said one or more beams and the selection of a second satellite to which to handoff the ongoing communications.

19. A satellite repeater system as set forth in claim 11, wherein said structure is a multi-story building having a plurality of floors, and wherein there is at least one of said in-structure transmit antennas and at least one of said in-structure receive antennas on selected ones of said floors.

20. A satellite repeater system as set forth in claim 19, wherein at least one of said in-structure transmit antennas and said in-structure receive antennas are comprised of leaky coaxial cables.

21. A satellite communications system of a type that includes a constellation of non-geosynchronous orbit satellites for relaying communications between a ground station and a user terminal, said ground station being bidirectionally coupled to a terrestrial communications network, said system comprising:

a communication signal repeater system located within a structure and coupled to a satellite antenna having transmit and receive capability, said communication signal repeater system comprised of, a first receive amplifier having an input coupled to said satellite antenna, said first receive amplifier having an output coupled to an input of at least one first transmit amplifier and in-structure transmit antenna for transmitting a received satellite communication signal within the structure for reception by at least one user terminal; and a second transmit amplifier having an output coupled to said satellite antenna, said second transmit amplifier having an input coupled to an output of at least one second receive amplifier and in-structure receive antenna that receives user terminal transmitted communication signals within the structure; wherein said user terminal is operative without modification both within said structure and outside of said structure for communicating with said terrestrial communications network, via at least one satellite of said constellation of satellites and said ground station.

22. A satellite communications system as set forth in claim 21, and further comprising a controller coupled to said satellite antenna for establishing a communication with at least one satellite of said constellation of satellites, and for handing off an on-going communication to another satellite.

* * * * *